United States Patent [19]
Morita

[11] Patent Number: 5,094,118
[45] Date of Patent: Mar. 10, 1992

[54] SPLINED BALL SCREW ASSEMBLY HAVING A NESTED STRUCTURE

[75] Inventor: Kunihiko Morita, Koganei, Japan
[73] Assignee: Nippon Thompson Co., Ltd., Tokyo, Japan
[21] Appl. No.: 577,354
[22] Filed: Sep. 4, 1990

[30] Foreign Application Priority Data
May 9, 1989 [JP] Japan .................. 1-104099[U]

[51] Int. Cl.⁵ ............................................. F16H 1/10
[52] U.S. Cl. ............................ 74/424.8 R; 74/89.15
[58] Field of Search ................. 74/22 R, 22 A, 89.15, 74/424.8 B, 424.8 R, 459

[56] References Cited
U.S. PATENT DOCUMENTS

| | | | |
|---|---|---|---|
| Re. 31,627 | 7/1984 | Evans | 74/89.15 |
| 2,718,165 | 9/1955 | Bourassa et al. | 74/424.8 B |
| 2,791,922 | 5/1957 | Robinson | 74/424.8 R |
| 2,987,045 | 6/1961 | Lear et al. | 74/424.8 R |
| 3,640,147 | 2/1972 | Fantoni | 74/424.8 R |
| 3,803,928 | 4/1974 | Konkal et al. | 74/89.15 |
| 4,000,661 | 1/1977 | Menzel | 74/89.15 |
| 4,614,128 | 9/1986 | Fickler | 74/424.8 B |

FOREIGN PATENT DOCUMENTS

| | | | |
|---|---|---|---|
| 1216815 | 4/1960 | France | 74/424.8 R |
| 2202607 | 9/1988 | United Kingdom | 74/89.15 |

Primary Examiner—Leslie A. Braun
Assistant Examiner—Ryan W. Massey
Attorney, Agent, or Firm—Skjerven, Morrill, MacPherson, Franklin & Friel

[57] ABSTRACT

A splined ball screw assembly having a nested structure is provided. A hollow shaft extends into an outer sleeve and a center shaft extends into the hollow portion of the hollow shaft. A ball screw structure is provided at either side of the outer and inner peripheral surfaces of the hollow shaft and a ball spline structure is provided on the other side. The outer sleeve is rotatably mounted on a housing and the center shaft is also rotatably mounted on the housing. By controlling the amount and direction of rotation of both of the outer sleeve and the center shaft, the hollow shaft may be moved longitudinally in a desired direction and/or set in rotation. The present assembly is compact in size and particularly suitable for use in a robot arm.

11 Claims, 6 Drawing Sheets

SPLINED BALL SCREW ASSEMBLY HAVING A NESTED STRUCTURE

BACKGROUND OF THE INVENTION

1. Field of the Invention

This invention generally relates to a splined ball screw assembly including a spiral guide channel, which is defined between a pair of inner and outer members and provided with a plurality of balls, and also one or more axial guide channels provided with a plurality of balls so as to allow to provide a relative axial movement between the inner and outer members. More particularly, the present invention relates to a splined ball screw assembly having a nested structure in which the spiral and axial guide channels are provided on the opposite peripheral surfaces of a hollow shaft.

2. Description of the Prior Art

A typical prior art splined ball screw assembly is described in the U.S. Pat. No. 3,046,808 and its representative structure is illustrated in FIG. 6. As shown, the splined ball screw assembly generally includes a shaft 26 which is formed with a ball screw section 70 and a ball spline section 71 as located side-by-side in the axial direction of the shaft 26. A spiral guide groove and a plurality of axial guide grooves are formed on the same portion of the shaft 26. The assembly also includes a nut 20 which is fitted onto the shaft 26 with a predetermined gap therebetween and a plurality of balls partly engaged with the spiral guide groove of the shaft 26 and partly engaged with the spiral guide groove of the nut 20. The assembly also includes an outer sleeve 72 which is located in a side-by-side relation with the nut 20 in the axial direction of the shaft 26 and which includes a plurality of endless guide passages filled with balls which are partly engaged with the respective axial guide grooves of the shaft when located at the load section of the endless guide passage.

With the above-described structure, when the nut 20 is driven to rotate in either direction through an associated drive gear train, the shaft 26 is caused to move in either direction along its axial direction without rotation through a spline engagement.

However, in the above-described prior art structure, since the ball screw section 70 and the ball spline section 71 are located in a side-by-side arrangement in the axial direction, the overall axial length of the completed assembly tends to be large. Thus, there is a limit in making the overall assembly compact in size. In addition, since both of the spiral and axial guide grooves are formed on the same portion of the shaft, processing tends to be complicated and care and high precision are required in processing, so that a relatively long period of time is required and an advanced processing technology is required, which tends to push up the cost.

SUMMARY OF THE INVENTION

In accordance with the present invention, there is provided a splined ball screw assembly which includes a hollow shaft having a pair of opposite inner and outer peripheral surfaces. A spiral guide channel is provided on either one of the inner and outer peripheral surfaces of the hollow shaft and at least one axial guide channel is provided on the other of the inner and outer peripheral surfaces of the hollow shaft. Thus, the present splined ball screw assembly has a nested structure in which its ball screw section and ball spline section are arranged radially with respect to its hollow shaft. Such a structure is advantages in many respects. For example, since it provides a nested structure, the ball screw and ball spline sections may be provided in an overlapping relation at least partly, which allows to make the overall axial size of the assembly shorter. Moreover, since each of the ball screw and ball spline sections is provided on either one of the inner and outer peripheral surfaces of the hollow shaft, processing is much easier and no special skills or technique are required in processing.

It is therefore a primary object of the present invention to provide an improved splined ball screw assembly compact in size, easy to manufacture and high in performance.

Another object of the present invention is to provide an improved splined ball screw assembly having a wider range of applications.

A further object of the present invention is to provide an improved splined ball screw assembly particularly suitable for use in a robot arm.

Other objects, advantages and novel features of the present invention will become apparent from the following detailed description of the invention when considered in conjunction with the accompanying drawings.

DESCRIPTION OF THE PREFERRED EMBODIMENTS

Figure 1:
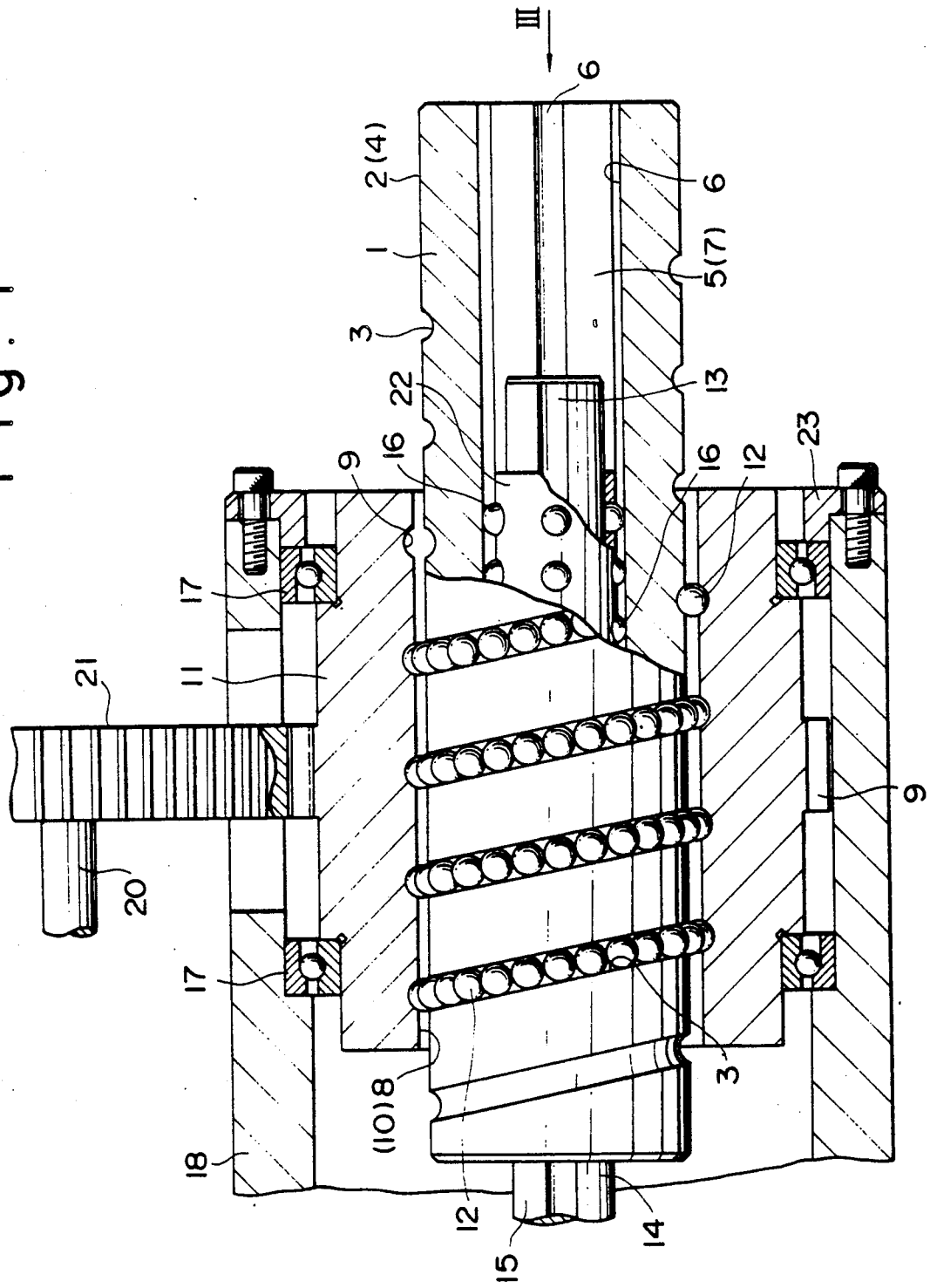
FIG. 1 is a schematic illustration showing partly in cross section a splined ball screw assembly constructed in accordance with one embodiment of the present invention.

Referring now to FIG. 1, there is schematically shown a splined ball screw assembly constructed in accordance with one embodiment of the present invention. As shown, the present assembly includes a hollow shaft 1 having an outer peripheral surface 2, which is formed with an inner spiral guide groove 3 to define an inner ball screw surface 4, and an inner peripheral surface 5, which is formed with a plurality of axial outer guide grooves 6, extending in parallel with the longitudinal axis of shaft 1, to define an outer ball spline surface 7. The assembly also includes a nut or sleeve 11 through which the shaft 1 extends with a predetermined gap therebetween. The nut 11 is formed with an outer spiral guide groove 9 at its inner peripheral surface corresponding to the inner spiral guide groove 3 of the shaft 1. Thus, when assembled, a spiral guide channel is defined by the inner and outer spiral guide grooves 3 and 9 between the shaft 1 and the nut 11. A plurality of balls 12 are provided in the spiral guide channel and thus the balls 12 are partly engaged with both of the inner and outer spiral guide grooves 3 and 9.

On the other hand, there is provided a center shaft 15 which extends into the hollow shaft 1 with a predetermined gap therebetween. An axial inner guide groove 13 is formed on the outer peripheral surface of the center shaft 15 corresponding to each of the axial outer guide grooves 6 of the hollow shaft 1. Thus, an axial guide channel is defined by a corresponding pair of outer and inner axial guide grooves 6 and 13 between the hollow shaft 1 and the center shaft 15. A plurality of balls 16 are provided in the axial guide channel in engagement with both of the outer and inner axial guide grooves 6 and 13. Accordingly, there is provided a spline connection between the hollow shaft 1 and the center shaft 15 so that no relative rotation is allowed between the shafts 1 and 15 while permitting a relative axial movement therebetween. In the illustrated embodiment, a cylindrical ball retainer 22 is provided between the hollow shaft 1 and the center shaft 15 so that the balls 16 are maintained in position in a predetermined spaced apart relation.

The ball screw nut 11 is mounted on a housing 18 rotatably through a pair of ball bearings 17 and a side plate 23 so that the nut 11 may rotate relative to the housing 18, but it is fixed in position in the longitudinal direction of the hollow shaft 1. Although not shown specifically, it should be understood that the center shaft 15 is also mounted directly or indirectly on the housing 18 rotatably and immovably in its longitudinal direction by a separate mounting means. The nut 11 is formed with gear teeth 19 around its outer peripheral surface, which is in mesh with a drive gear 21 fixedly mounted on a drive shaft 20, which, in turn, is coupled to a drive source, such as a motor. Thus, when the drive gear 21 is driven to rotate, the nut 11 is also driven to rotate. Although it is not shown specifically, it should be understood that the nut 11 is formed with a return path extending from its one end to the other end such that the balls 12 are fed into the return path from the inner spiral guide groove 3 and then the balls 12 after passing through the return path are fed back into the inner spiral guide groove 3 so as to move the balls 12 in an endless circulating path. It should also be understood that since the ball retainer 22 is provided in the present embodiment, there is a limit in a relative axial movement between the hollow shaft 1 and the center shaft 15. Therefore, the assembly shown in FIG. 1 is of the finite stroke type in which there is a limit in relative motion between the hollow shaft 1 and the center shaft 15.

Figure 2:
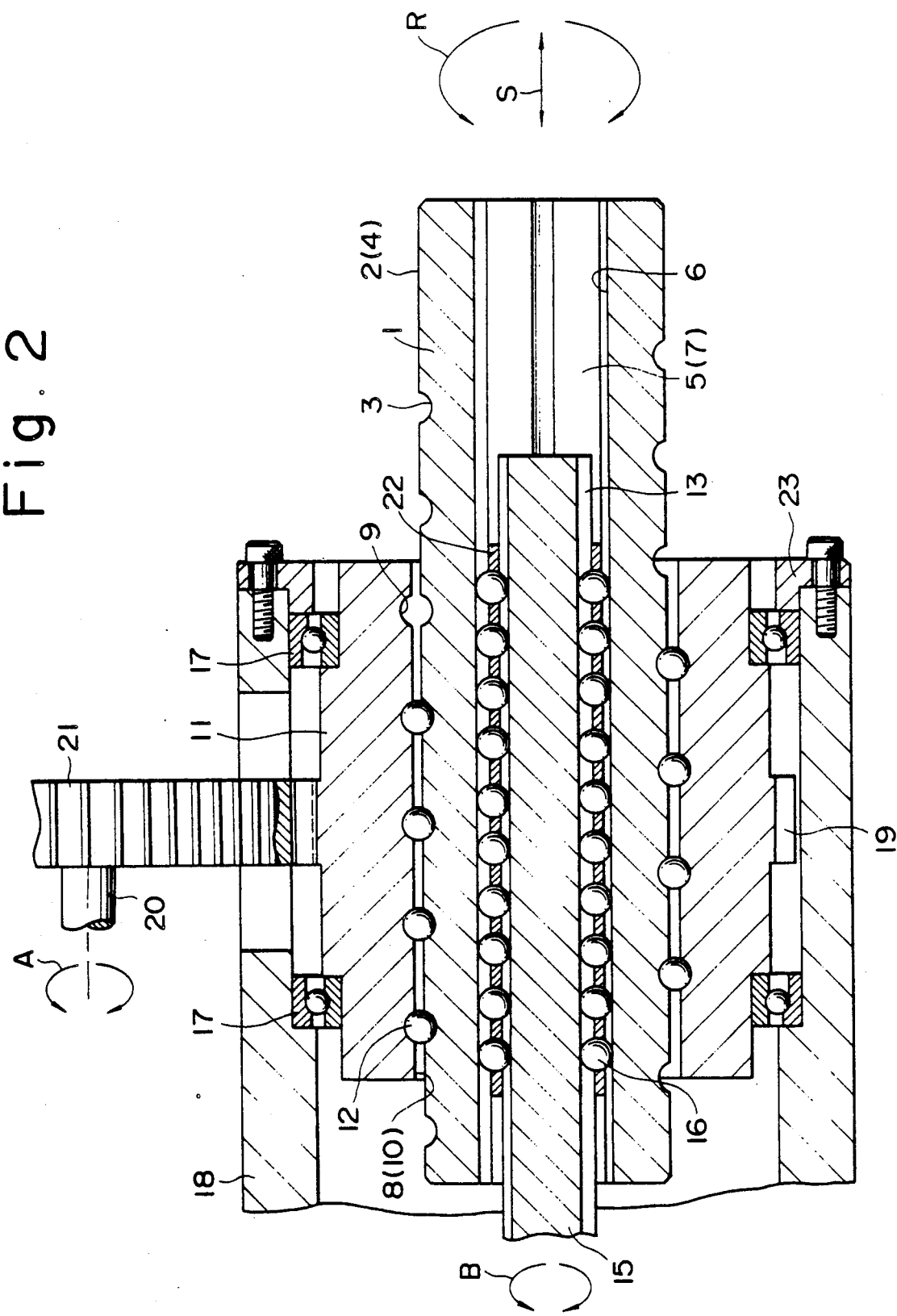
FIG. 2 is a schematic illustration showing in longitudinal cross section the assembly shown in FIG. 1.

Referring now to FIG. 2 also, the operation of the present assembly will be described. If it is desired to move the hollow shaft 1 in either direction indicated by double arrow S along its longitudinal axis without rotation, it is only necessary to keep the center shaft 15 stationary and to rotate the drive shaft 20 in either direction indicated by double arrow A. When the drive shaft 20 is driven to rotate, its rotation is transmitted to the nut 11 and as a result the hollow shaft 1 is caused to move in its longitudinal direction S. The direction of movement of the hollow shaft 1 is controlled by the direction of rotation of the drive shaft 20, and the amount of longitudinal movement of the hollow shaft 1 is controlled by the amount of angle of rotation of the drive shaft 20.

If it is desired to rotate the hollow shaft 1 in either direction indicated by double arrow R, it is only necessary to couple one end of the center shaft 15 to a stepping motor or the like (not shown) to rotate the center shaft 15 in a desired direction as indicated by double arrow B. In this case, if the drive shaft 20 is kept fixed and only the center shaft 15 is driven to rotate in a desired direction, the hollow shaft 1 will execute rotation in a direction indicated by double arrow R and also a longitudinal movement in a direction indicated by double arrow S. However, if it is desired to only to rotate the hollow shaft 1 without longitudinal movement, it is only necessary to rotate the drive shaft 20 in association with the rotation of the center shaft 15 such that the longitudinal movement of the hollow shaft 1 caused by the center shaft 15 is cancelled by the longitudinal movement of the hollow shaft 1 caused by the drive shaft 20 in the opposite direction. Similarly, if it is desired to rotate the hollow shaft 1 and to move it longitudinally, the amounts of rotation and longitudinal movement can be easily controlled by controlling relative amounts of rotation between the center shaft 15 and the drive shaft 20.

Figure 3:
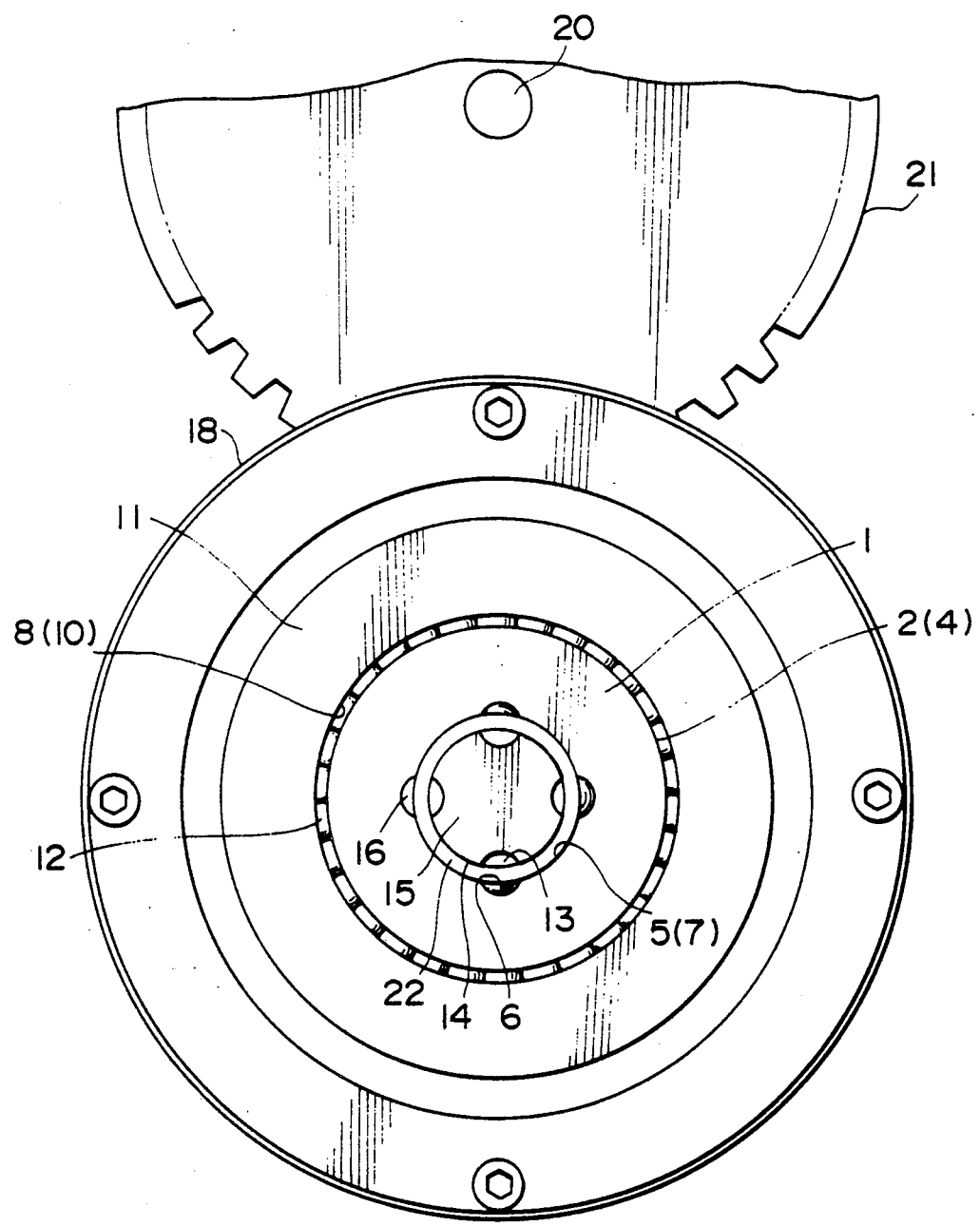
FIG. 3 is a schematic illustration taken in the direction of arrow III (FIG. 1) showing in a side view the assembly shown in FIG. 1.

As shown in FIG. 3, there are provided four axial guide channels between the hollow shaft 1 and the center shaft 15 in the illustrated embodiment. It should be noted, however, that any desired number, preferably two or more, of such axial guide channels may be provided. Each of the outer and inner axial guide grooves 6 and 13 may be the so-called Gothic arch groove or the well-known circular arc groove.

Figure 4:
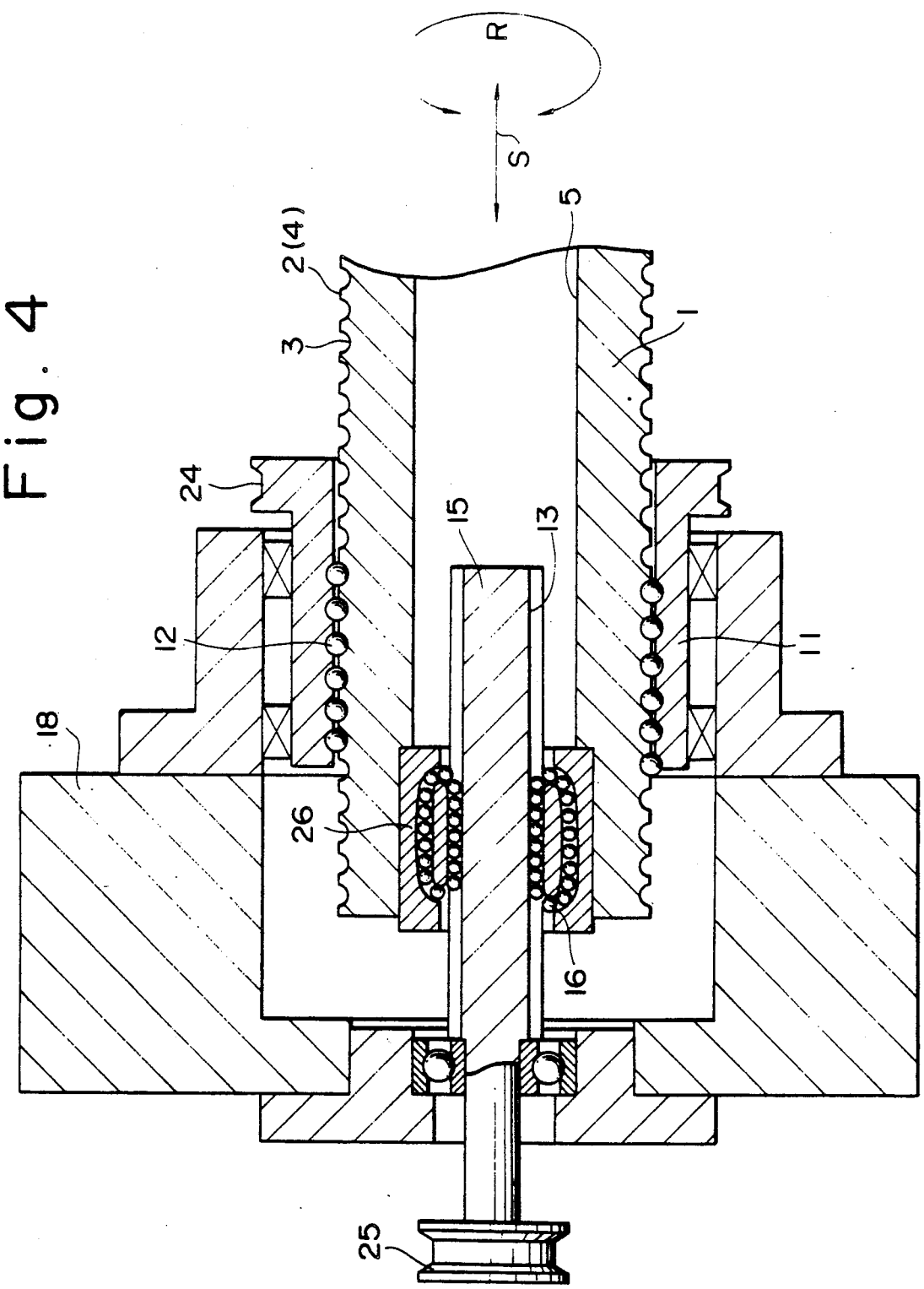
FIG. 4 is a schematic illustration showing in longitudinal cross section another embodiment of the present invention.

FIG. 4 illustrates a splined ball screw assembly constructed in accordance with another embodiment of the present invention. In this embodiment, the nut 11 is integrally formed with a pulley 24 which is operatively coupled to a driving source, such as a motor, through a belt. The center shaft 15 is also integrally formed with a pulley 25 which is also operatively coupled to another driving source through a belt. Thus, the nut 11 and the center shaft 15 may be driven to rotate individually by means of separate driving sources. As different from the first embodiment shown in FIGS. 1 through 3, the present assembly includes a spline sleeve 26 which is fixedly mounted on the hollow shaft 1 and which is formed with a plurality of endless circulating paths. Each endless circulating path includes a return path section and a load path section which is defined by the outer axial guide groove formed in the spline sleeve 26. The balls 16 are provided in the endless circulating path so that there is theoretically provided an infinite relative longitudinal motion between the hollow shaft 1 and the center shaft 15. The remaining structure is basically the same as that of the first embodiment shown in FIGS. 1 through 3.

Figure 5:
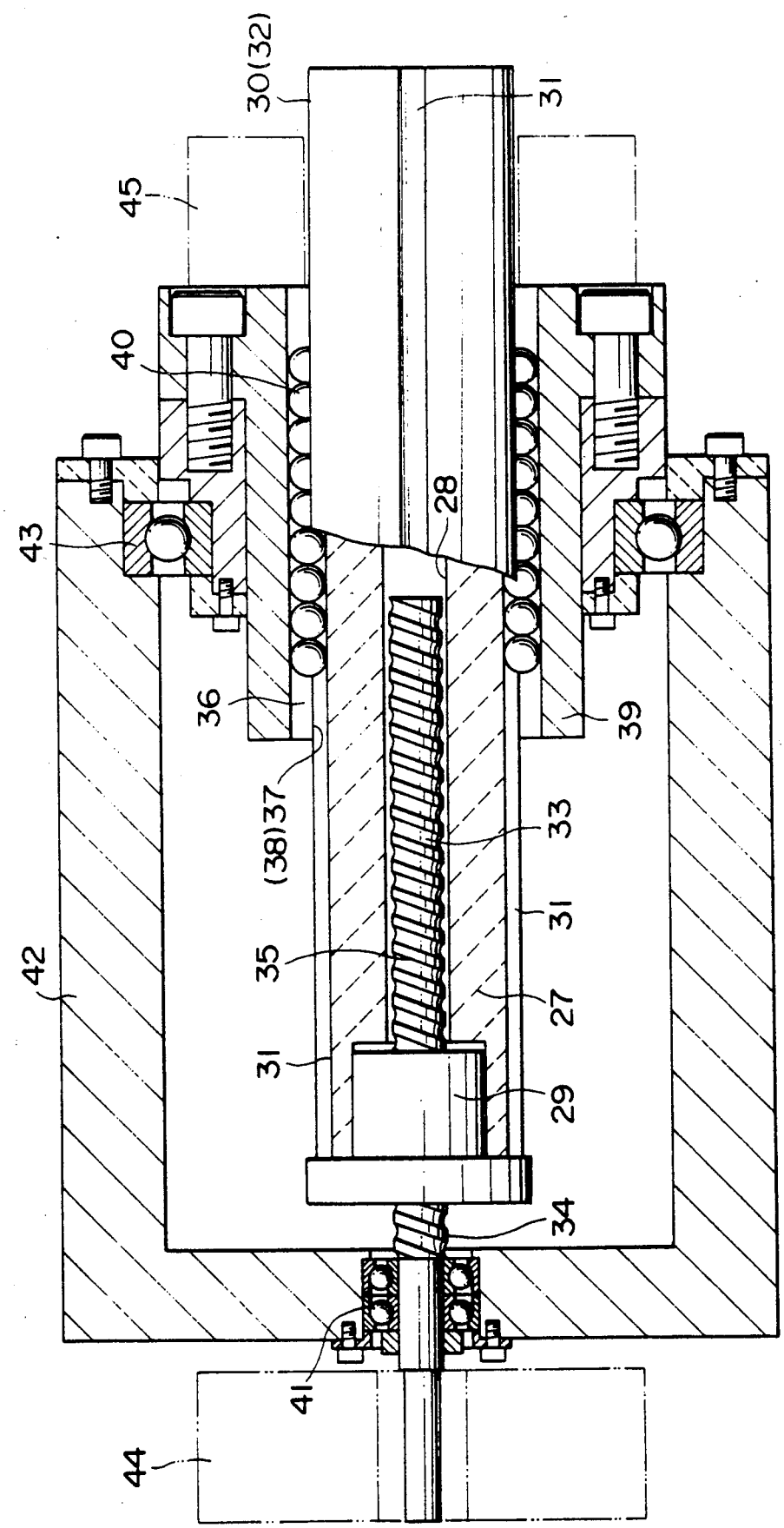
FIG. 5 is a schematic illustration showing partly in cross section a further embodiment of the present invention.
Figure 6:
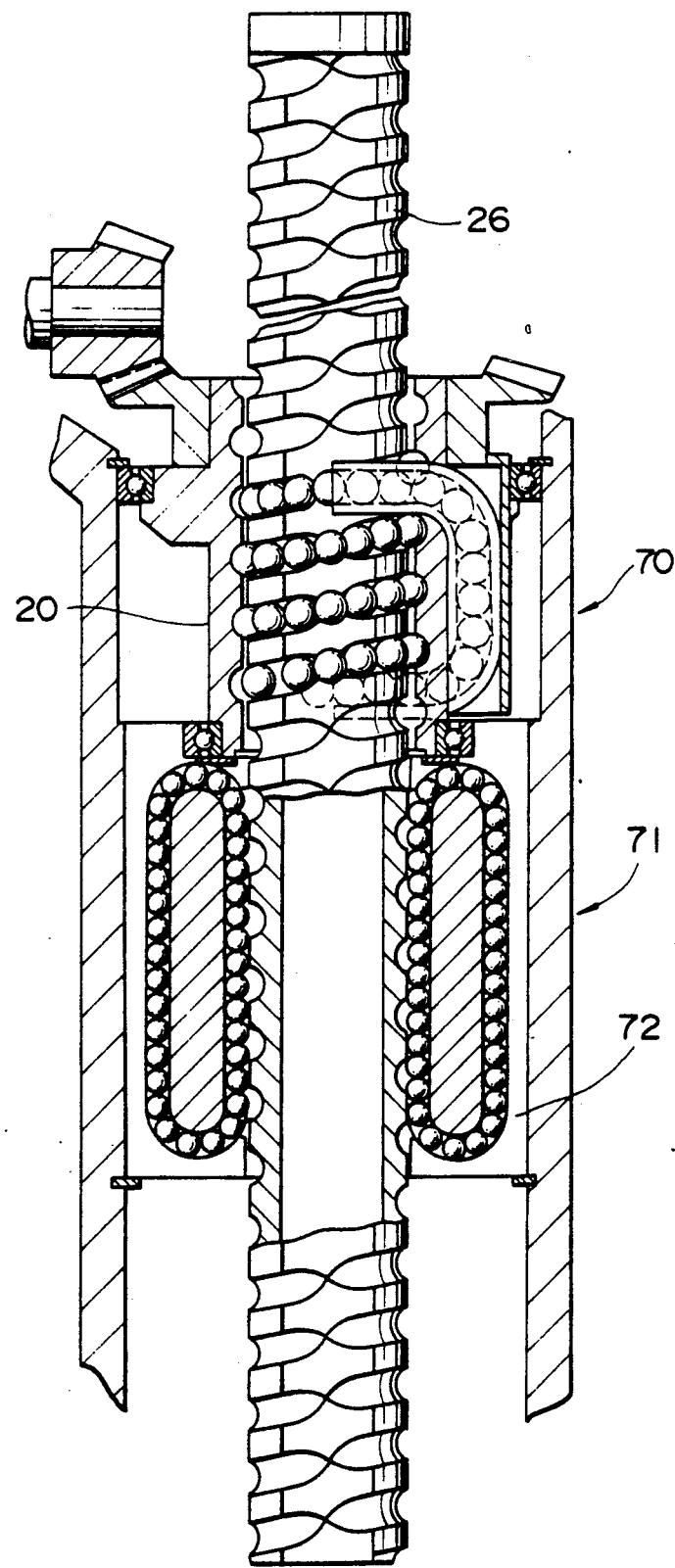
FIG. 6 is a schematic illustration showing a typical prior art splined ball screw assembly described in the U.S. Pat. No. 3,046,808.

FIG. 5 illustrates a splined ball screw assembly constructed in accordance with a further embodiment of the present invention. As different from the previous embodiments, the present assembly includes a hollow shaft 27 which has an inner peripheral surface 28 and also an outer peripheral surface 30. In this embodiment, neither spiral guide groove nor axial guide groove is provided directly on the inner peripheral surface 28 of the hollow shaft 27. Instead, the hollow portion of the hollow shaft 27 is enlarged at one end and a ball screw nut 29 having an outer spiral guide groove (not shown) is fixedly fitted into the enlarged hollow portion. Thus, the hollow shaft 27, effectively, is provided with an outer spiral guide groove through the ball screw nut 29. On the other hand, the outer peripheral surface 30 of the hollow shaft 27 is formed with a plurality of axial inner guide grooves 31 extending in the longitudinal direction to thereby define a ball spline surface 32.

The present assembly also includes a screw shaft 35 which extends through the ball screw nut 29 and into the hollow space of the hollow shaft 27 and which is formed with an inner spiral guide groove 33. Although not shown specifically, a plurality of balls are provided in the ball screw nut 29 in engagement with both of the outer spiral guide groove of the nut 29 and the inner spiral guide groove 33 of the screw shaft 35. Also provided in the present assembly is an outer sleeve 39 which has an inner peripheral surface 37 formed with a plurality of axial outer guide grooves 36 each aligned with a corresponding one of the inner axial guide grooves 31 of the hollow shaft 27. Thus, an axial guide channel is defined by a corresponding pair of inner and outer axial guide grooves 31 and 36, and a plurality of balls 40 are provided in the axial guide channel in engagement with both of the inner and outer axial guide grooves 31 and 36. Accordingly, a ball spline structure is provided between the hollow shaft 27 and the outer sleeve 39 so that no relative rotation is allowed therebetween while permitting a relative longitudinal movement.

The screw shaft 35 is rotatably mounted on a housing 42 by means of a ball bearing 41, but the screw shaft 35 does not move in its longitudinal direction. On the other hand, the outer sleeve 39 is also rotatably mounted on the housing 42 by means of a ball bearing 43. The outer sleeve 39 does not move longitudinally relative to the housing 42. A pulley 44 is fixedly mounted at one end of the screw shaft 35 and outside the housing 42 so that the screw shaft 35 may be set in rotation through the pulley 44 which is operatively coupled to a driving source, such as a motor, through a belt. The outer sleeve 39 is also formed with a pulley 45 which is operatively coupled to another driving source, such as a motor, through a belt. Thus, the screw shaft 35 and the outer sleeve 39 may be driven to rotate independently from each other.

As described above, in accordance with the present invention, since a nested structure is provided between a ball screw section and a ball spline section, these sections may be located in an overlapping relation so that the overall length of the assembly can be minimized. In addition, spiral and axial guide grooves are not formed in an superimposed relation and each of these grooves is formed on one side of the hollow shaft, processing is easy so that the cost may be reduced, and the assembly can be manufactured at high precision so that an enhanced performance can be obtained. The present invention is particularly suitable for use in a robot arm.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A splined ball screw assembly, comprising:
   a sleeve rotatably mounted on a housing;
   a hollow shaft having an outer peripheral surface and an inner peripheral surface, said hollow shaft extending through said sleeve with a predetermined gap therebetween;
   a center shaft rotatably mounted on said housing and extending into a hollow portion of said hollow shaft with a predetermined gap therebetween;
   first engaging means provided between said sleeve and said hollow shaft for engaging both of said sleeve and said hollow shaft to provide a first predetermined relative motion between said sleeve and said hollow shaft;
   second engaging means provided between said hollow shaft and said center shaft for engaging both of said hollow shaft and said center shaft to provide a second predetermined relative motion, which is different from said first predetermined relative motion, between said hollow shaft and said center shaft;
   first rotating means for rotating said sleeve;
   second rotating means for rotating said center shaft; and
   wherein one of said first and second engaging means includes a ball spline engagement structure and the other of said first and second engaging means includes a ball screw engagement structure, one of said structures extending between said sleeve and said hollow shaft and the other of said structures extending between said hollow shaft and said center shaft.

2. The assembly of claim 1, wherein said first engaging means includes a spiral guide channel defined between said sleeve and said hollow shaft and a plurality of balls provided in said spiral guide channel.

3. The assembly of claim 2, wherein said spiral guide channel is defined by an outer spiral guide groove formed in an inner peripheral surface of said sleeve and a corresponding inner spiral guide groove formed in the outer peripheral surface of said hollow shaft.

4. The assembly of claim 3, wherein said second engaging means includes a plurality of axial guide channels defined between said hollow shaft and said center shaft and a plurality of balls provided in said plurality of axial guide grooves.

5. The assembly of claim 4, wherein each of said plurality of axial guide channels is defined by an outer axial guide groove formed in the inner peripheral surface of said hollow shaft extending in parallel with the longitudinal axis thereof and a corresponding inner axial guide groove formed in an outer peripheral surface of said center shaft.

6. The assembly of claim 5, further comprising cylindrical retaining means fitted in the gap between said hollow shaft and said center shaft for retaining said plurality of balls in position.

7. The assembly of claim 4, wherein each of said axial guide channels is defined by an axial guide groove formed in either of said hollow shaft and said center shaft and an endless circulation path formed in the other of said hollow shaft and said center shaft.

8. The assembly of claim 1, wherein said first engaging means includes a plurality of axial guide channels defined between said sleeve and said hollow shaft and a plurality of balls provided in said plurality of axial guide channels.

9. The assembly of claim 8, wherein each of said axial guide channels is defined by an outer axial guide groove formed in the inner peripheral surface of said sleeve and a corresponding inner axial guide groove formed in the outer peripheral surface of said hollow shaft.

10. The assembly of claim 9, wherein said second engaging means includes a spiral guide channel defined between said hollow shaft and said center shaft.

11. The assembly of claim 10, wherein said spiral guide channel is defined by an outer spiral guide groove provided integrally with said hollow shaft and a corresponding inner spiral guide groove provided integrally with said center shaft.

* * * * *